United States Patent
Hu et al.

(10) Patent No.: US 12,526,393 B2
(45) Date of Patent: Jan. 13, 2026

(54) ORAL STEREOSCOPIC SCANNING DEVICE CAPABLE OF DETECTING THE TOOTH SURFACE OUTLINE AND ACCURATELY CHECKING WHETHER THE TOOTH IS DECAYED

(71) Applicant: QISDA CORPORATION, Taoyuan (TW)

(72) Inventors: Chih-Ming Hu, Taoyuan (TW); Ying-Fang Lin, Taoyuan (TW); Cheng-Chieh Juan, New Taipei (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 19/017,796

(22) Filed: Jan. 13, 2025

(65) Prior Publication Data
US 2025/0254283 A1 Aug. 7, 2025

(30) Foreign Application Priority Data
Feb. 7, 2024 (CN) .......................... 202410172419.9

(51) Int. Cl.
*H04N 7/18* (2006.01)
*H04N 13/254* (2018.01)
*H04N 13/257* (2018.01)

(52) U.S. Cl.
CPC ......... *H04N 13/257* (2018.05); *H04N 13/254* (2018.05)

(58) Field of Classification Search
CPC ................................................... H04N 13/257
(Continued)

(56) References Cited

U.S. PATENT DOCUMENTS

| 2003/0112507 A1* | 6/2003 | Divelbiss | H04N 13/365 348/E13.058 |
| 2008/0180640 A1* | 7/2008 | Ito | G03B 21/005 353/31 |

(Continued)

FOREIGN PATENT DOCUMENTS

| CN | 101563021 | 10/2009 |
| CN | 102947682 | 2/2013 |

(Continued)

OTHER PUBLICATIONS

Hu, the specification, including the claims, and drawings in the U.S. Appl. No. 19/012,834, filed Jan. 7, 2025.

(Continued)

*Primary Examiner* — Leron Beck

(57) ABSTRACT

A stereoscopic scanning device is applied by a stereoscopic scanning method and includes a projection module and an imaging module. The projection module emits a visible beam to a structural light generator to project a structural light pattern onto a target object, and further emits an invisible beam to the target object for generating a first excitation beam and/or a second excitation beam. The imaging module includes an optical sensor and a color filter. The optical sensor receives the structural light pattern and the excitation beams. The color filter has a first filtering region and a second filtering region. The first filtering region allows penetration of the visible beam and the first excitation beam, and blocks transmission of the second excitation beam. The second filtering region allows penetration of the visible beam and the second excitation beam, and blocks transmission of the first excitation beam.

14 Claims, 7 Drawing Sheets

(58) Field of Classification Search
USPC .......................................................... 348/47
See application file for complete search history.

(56) References Cited

U.S. PATENT DOCUMENTS

| | | | | |
|---|---|---|---|---|
| 2013/0341508 | A1* | 12/2013 | Betsui | H04N 13/39 |
| | | | | 250/329 |
| 2017/0180708 | A1* | 6/2017 | Hazeghi | H04N 13/254 |
| 2018/0028065 | A1* | 2/2018 | Elbaz | G06T 7/55 |
| 2018/0270474 | A1* | 9/2018 | Liu | A61B 5/0064 |
| 2022/0364853 | A1* | 11/2022 | Zhao | H04N 13/25 |

FOREIGN PATENT DOCUMENTS

| | | |
|---|---|---|
| CN | 104783757 | 7/2015 |
| CN | 112985307 | 6/2021 |

OTHER PUBLICATIONS

Hu, the specification, including the claims, and drawings in the U.S. Appl. No. 19/014,144, filed Jan. 8, 2025.

* cited by examiner

ORAL STEREOSCOPIC SCANNING DEVICE CAPABLE OF DETECTING THE TOOTH SURFACE OUTLINE AND ACCURATELY CHECKING WHETHER THE TOOTH IS DECAYED

BACKGROUND OF THE INVENTION

1. Field of the Invention

The present invention relates to a stereoscopic scanning device and a stereoscopic scanning method, and more particularly, to a stereoscopic scanning device with a plaque detection function and a related stereoscopic scanning method.

2. Description of the Prior Art

A conventional oral scanner utilizes the visible beam light source and the structural light generator to project the structural light pattern onto the tooth, and further utilizes the optical sensor to receive the structural light pattern reflected from the tooth for acquiring the surface outline of the tooth. The visible beam light source includes the blue light source, the green light source and the red light source. The optical sensor of the conventional oral scanner performs color reconstruction according to the three primary color reflection spectra of the tooth, and true color of the tooth surface outline is showed on the display screen connected to the oral scanner. However, the conventional oral scanner only has the detection function of the tooth surface outline, and cannot detect the unhealthy tooth (such as dental plaque, caries, etc.). Design of an oral stereoscopic scanning device capable of detecting the tooth surface outline and accurately checking whether the tooth is decayed is an important issued in the related medical equipment.

SUMMARY OF THE INVENTION

The present invention provides a stereoscopic scanning device with a plaque detection function and a related stereoscopic scanning method for solving above drawbacks.

According to the claimed invention, a stereoscopic scanning device has a plaque detection function and is applied to a target object. The stereoscopic scanning device includes a projection module and an imaging module. The projection module includes a structural light generator, a visible beam light source and an invisible beam light source. The structural light generator is adapted to generate a structural light pattern. The visible beam light source is adapted to emit a visible beam to a structural light generator so that the structure light pattern is projected onto the target object. The invisible beam light source is adapted to emit an invisible beam towards the target object for generating a first excitation beam and/or a second excitation beam. The imaging module is relatively disposed adjacent to the projection module. The imaging module includes an optical sensor and a color filter. The optical sensor is adapted to receive the structural light pattern reflected from the target object and the first excitation beam and the second excitation beam generated by the target object. The color filter is disposed on a side of the optical sensor facing the target object. The color filter has a first filtering region and a second filtering region adjacent to each other and aligns with the optical sensor by turns. The first filtering region allows penetration of the visible beam and the first excitation beam, and blocks transmission of the second excitation beam. The second filtering region allows penetration of the visible beam and the second excitation beam, and blocks transmission of the first excitation beam.

According to the claimed invention, stereoscopic scanning method includes utilizing a visible beam light source and a structural light generator to project a structural light pattern onto a target object, utilizing an optical sensor to receive the structural light pattern reflected from the target object for acquiring structure information of the target object, utilizing an invisible beam light source to project an invisible beam onto the target object for generating a first excitation beam and/or a second excitation beam, driving a first filtering region and a second filtering region of a color filter to alternately align with an imaging path of the invisible beam, utilizing the optical sensor to receive the first excitation beam passing through the first filtering region and the second excitation beam passing through the second filtering region for acquiring lesion information of the target object, and generating a scanning result by combining the structure information with the lesion information.

The stereoscopic scanning device and the stereoscopic scanning method of the present invention can dispose the rotatable or shiftable color filter on the imaging path. The optical sensor can be the monochromatic sensor, and the present invention can alternately activate the visible beam light source and the invisible beam light source at different points of time, to avoid the green fluorescent and the red fluorescent generated by the invisible beam projected onto the target object from being affected by the green light beam and the red light beam of the visible beam; the present invention can further alternately activate the blue light emitter, the green light emitter and the red light emitter of the visible beam light source at different points of time, so that the blue light beam and the green light beam and the red light beam can pass through the related filtering region of the color filter by turns. Therefore, the stereoscopic scanning device with a plaque detection function of the present invention can acquire the colorful detection image of the tooth outline model in the normal mode, and further acquire the detection image of the tooth outline model in the caries mode for detecting whether the tooth has the dental plaque or the structural defect.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
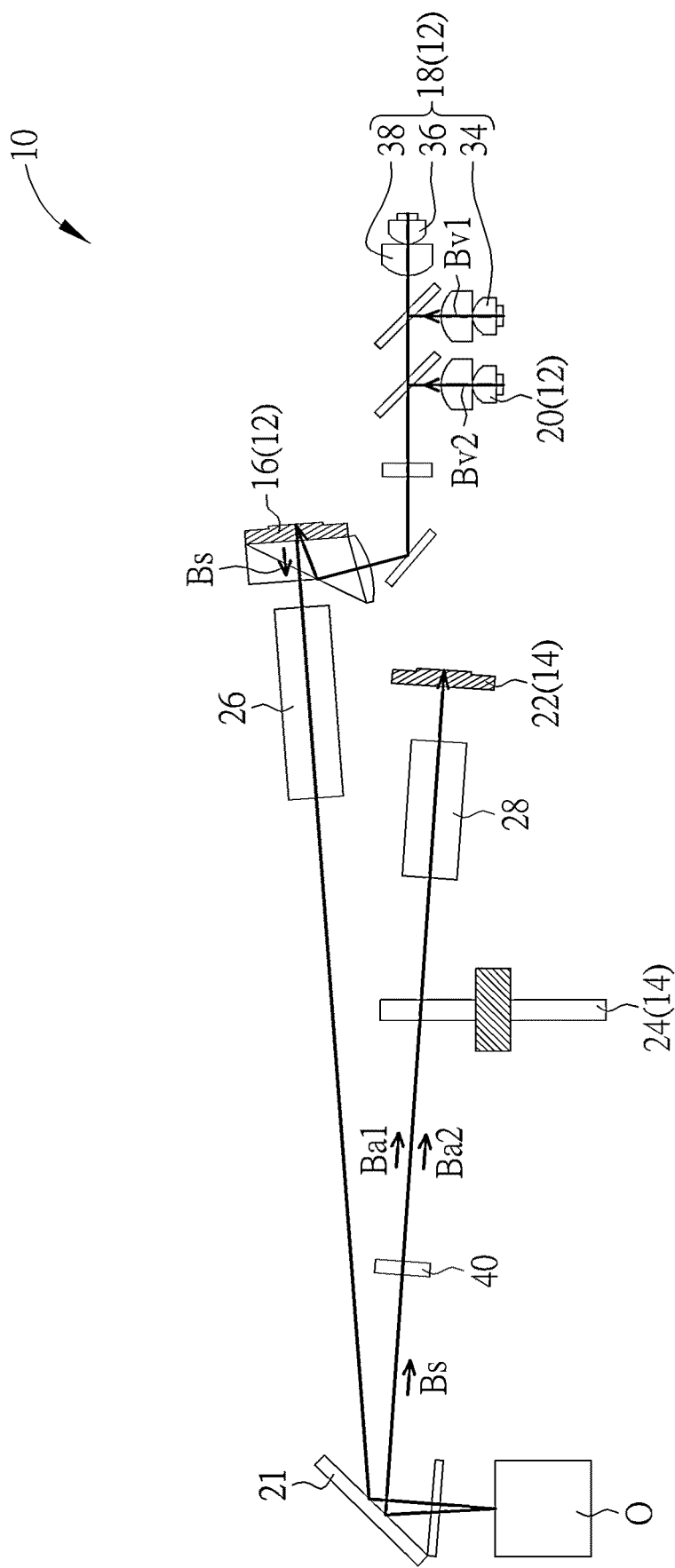
FIG. 1 is a diagram of a stereoscopic scanning device according to a first embodiment of the present invention.

Please refer to FIG. 1. FIG. 1 is a diagram of a stereoscopic scanning device 10 according to a first embodiment of the present invention. The stereoscopic scanning device 10 can include a projection module 12 and an imaging module 14. The stereoscopic scanning device 10 can be an oral scanner or any related medical apparatus. The projection module 12 can provide illumination required for the oral scanner operated in a normal mode and a caries mode. The imaging module 14 can acquire a scanning result of the stereoscopic scanning device 10 in the normal mode and the caries mode. The stereoscopic scanning device 10 set in the normal mode can quickly provide a tooth model. The stereoscopic scanning device 10 set in the caries mode can detect whether the tooth is a decayed tooth or has a structural defect. The projection module 12 can include a structural light generator 16, a visible beam light source 18 and an invisible beam light source 20. The visible beam light source 18 can be used to emit a visible beam Bv1 towards the structural light generator 16, so that a structural light pattern Bs generated by the structural light generator 16 can be reflected towards the target object O via a mirror 21. The structural light generator 16 can be a digital micromirror device or any element with a similar function.

The invisible beam light source 20 can be used to emit an invisible beam Bv2 towards the target object O. In the present invention, the invisible beam Bv2 can be a near ultraviolet light beam, which has a central wavelength about 405 nm. When the target object O is the tooth and the tooth has bacteria (or dental plaque), the invisible beam Bv2 can be projected onto the caries to excite and generate a first excitation beam Ba1, such as red fluorescent; if the tooth does not have the bacteria, the invisible beam Bv2 can be projected onto a normal area of the target object O to excite and generate a second excitation beam Ba2, such as green fluorescent. If the tooth is broken or in the early stage of the decayed tooth, the imaging module 14 can have an image with a partial black pattern on the tooth when the invisible beam Bv2 is projected onto the foresaid tooth because fluorescence on the target object O is disappeared; which means the tooth model may have the partial black pattern.

The imaging module 14 can be disposed relative to the projection module 12. The imaging module 14 can include an optical sensor 22 and a color filter 24. The optical sensor 22 can be used to receive the structural light pattern Bs reflected from the target object O and the first excitation beam Ba1 and the second excitation beam Ba2 generated by the target object O. The color filter 24 can be disposed on a side of the optical sensor 22 facing the target object O. In addition, the projection module 12 can optionally include projection lens assembly 26 and imaging lens assembly 28, which are respectively composed of several optical elements, and a detailed description is omitted herein for simplicity. The projection lens assembly 26 can be located on a light end of the structural light generator 16, and the structural light pattern Bs can be projected onto the target object O through the projection lens assembly 26; in the first embodiment, the invisible beam Bv2 can be projected onto the target object O through the projection lens assembly 26. The imaging lens assembly 28 can be disposed on the side of the optical sensor 22 facing the target object O. The structural light pattern Bs reflected from the target object O and the first excitation beam Ba1 and the second excitation beam Ba2 generated by the target object O can pass through the imaging lens assembly 28 and be received by the optical sensor 22.

Figure 2:
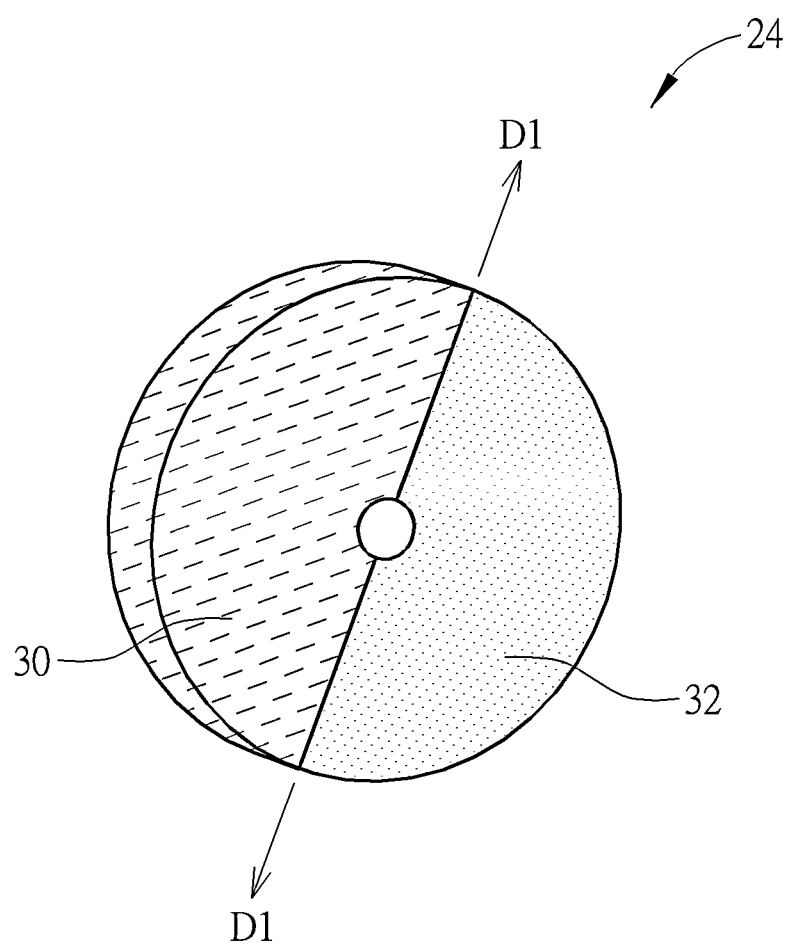
FIG. 2 is a diagram of the color filter according to the embodiment of the present invention.

Please refer to FIG. 2. FIG. 2 is a diagram of the color filter 24 according to the embodiment of the present invention. The color filter 24 can have a first filtering region 30 and a second filtering region 32 adjacent to each other. In the embodiment, the color filter 24 can be an annular filter disposed between the optical sensor 22 and the target object O in a rotatable manner, so that the first filtering region 30 and the second filtering region 32 of the color filter 24 can align with an imaging path between the optical sensor 22 and the imaging lens assembly 28 by turns; as mentioned above, the structural light pattern Bs and the first excitation beam Ba1 and the second excitation beam Ba2 generated by the invisible beam Bv2 can share the imaging path, so as to achieve an aim of volume reduction and accurate multitasking operation (which means acquiring a detection image of the tooth outline model and detecting whether the tooth has the dental plaque or is the caries).

When the color filter 24 is the annular filter, the color filter 24 can be divided into the first filtering region 30 and the second filtering region 32 in different radial directions D1. A size ratio of the first filtering region 30 to the second filtering region 32 can depend on a design demand, and is not limited to the embodiment shown in FIG. 2. The first filtering region 30 can allow penetration of the visible beam Bv1 and the first excitation beam Ba1, and block transmission of the second excitation beam Ba2. The second filtering region 32 can allow penetration of the visible beam Bv1 and the second excitation beam Ba2, and block transmission of the first excitation beam Ba1. The color filter 24 that is designed as the annular filter can alternately align with or be away from the optical sensor 22, which means the color filter 24 can be moved into or out of the imaging path accordingly. With rotation of the color filter 24, the first filtering region 30 and the second filtering region 32 can align with the optical sensor 22 by turns; when the color filter 24 is moved out of the imaging path, the structural light pattern Bs in the imaging path does not pass through the color filter 24.

In the present invention, the visible beam light source 18 can at least include a blue light emitter 34, and the visible beam Bv1 can be a blue light beam used to emit towards the structural light generator 16 for generating the structural light pattern Bs; the optical sensor 22 can acquire the structural light pattern Bs (such as the blue light beam) reflected from the target object O to form the monochromatic tooth model. Accordingly, the stereoscopic scanning device 10 can optionally set a monochromatic sensor as the optical sensor 22. Besides, the visible beam light source 18 can be further include a green light emitter 36 and a red light emitter 38 used to respectively emit the visible beam Bv1 belonging to a green light beam and a red light beam. The optical sensor 22 can acquire the structural light pattern Bs reflected from the target object O and the visible beam Bv1 belonging to the three primary colors to form the colorful tooth model; in the embodiment, the optical sensor 22 can be the monochromatic sensor, and the visible beam light source 18 can alternately emit the blue light beam, the green light beam and the red light beam at different points of time.

In addition, the imaging module 14 can optionally include an invisible beam filter 40 disposed on the side of the optical sensor 22 facing the target object O, and located inside the imaging path. The invisible beam filter 40 can be used to filter the invisible beam Bv2. When the stereoscopic scanning device 10 is switched into the caries mode and the projection module 12 utilizes the invisible beam light source 20 to emit the invisible beam Bv2, the invisible beam Bv2 projected onto the target object O (such as the tooth) can be excited to generate the first excitation beam Ba1 and/or the second excitation beam Ba2, and some of the invisible beam Bv2 may be reflected from the target object O and enter the imaging path, so that the invisible beam filter 40 can filter the invisible beam Bv2 reflected from the target object O to avoid affecting the detection result of the caries mode.

Figure 3:
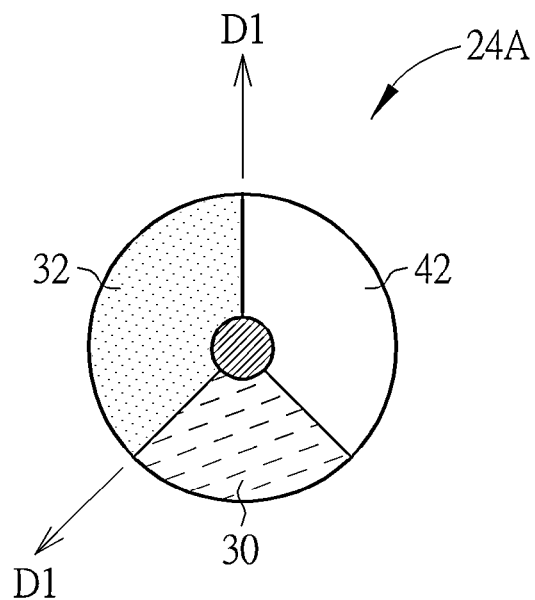
FIG. 3 and FIG. 4 are diagrams of the color filters according to different embodiments of the present invention.
Figure 4:
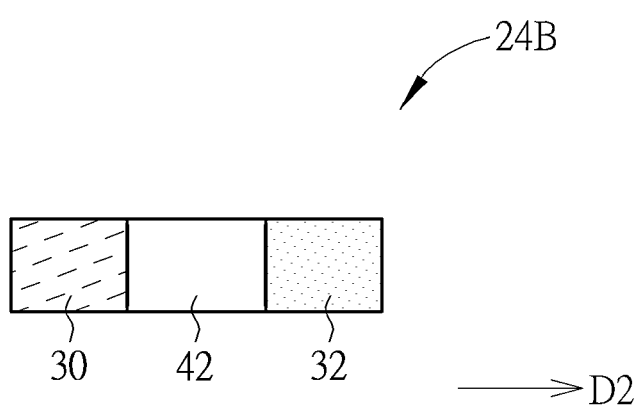

Please refer to FIG. 3 and FIG. 4. FIG. 3 and FIG. 4 are diagrams of the color filters 24A and 24B according to different embodiments of the present invention. As the embodiment shown in FIG. 3, the color filter 24A can further include a visible light transmittance area 42 adjacent to the first filtering region 30 and the second filtering region 32. The color filter 24A can be kept inside the imaging path, and some of the color filter 24A may align with the optical sensor 22; that is to say, with the rotation of the color filter 24, the first filtering region 30 and the second filtering region 32 and the visible light transmittance area 42 can be moved into the imaging path by turns to align with the optical sensor 22. As the embodiment shown in FIG. 4, the color filter 24B can be designed as a strip filter, which is disposed between the optical sensor 22 and the target object O in a shiftable manner. The color filter 24B can include the first filtering region 30, the second filtering region 32 and the visible light transmittance area 42 adjacent to each other, and the color filter 24B can be divided into the first filtering region 30 and the second filtering region 32 in a shifting direction D2; practical application of the color filter 24B is not limited to the foresaid embodiment. For example, the color filter 24B may only include the first filtering region 30 and the second filtering region 32 adjacent to each other, which is not shown in the figures. The first filtering region 30, the second filtering region 32 and the visible light transmittance area 42 of the color filter 24B can take turns to enter the imaging path in the shifting direction D2 for aligning with the optical sensor 22.

Figure 5:
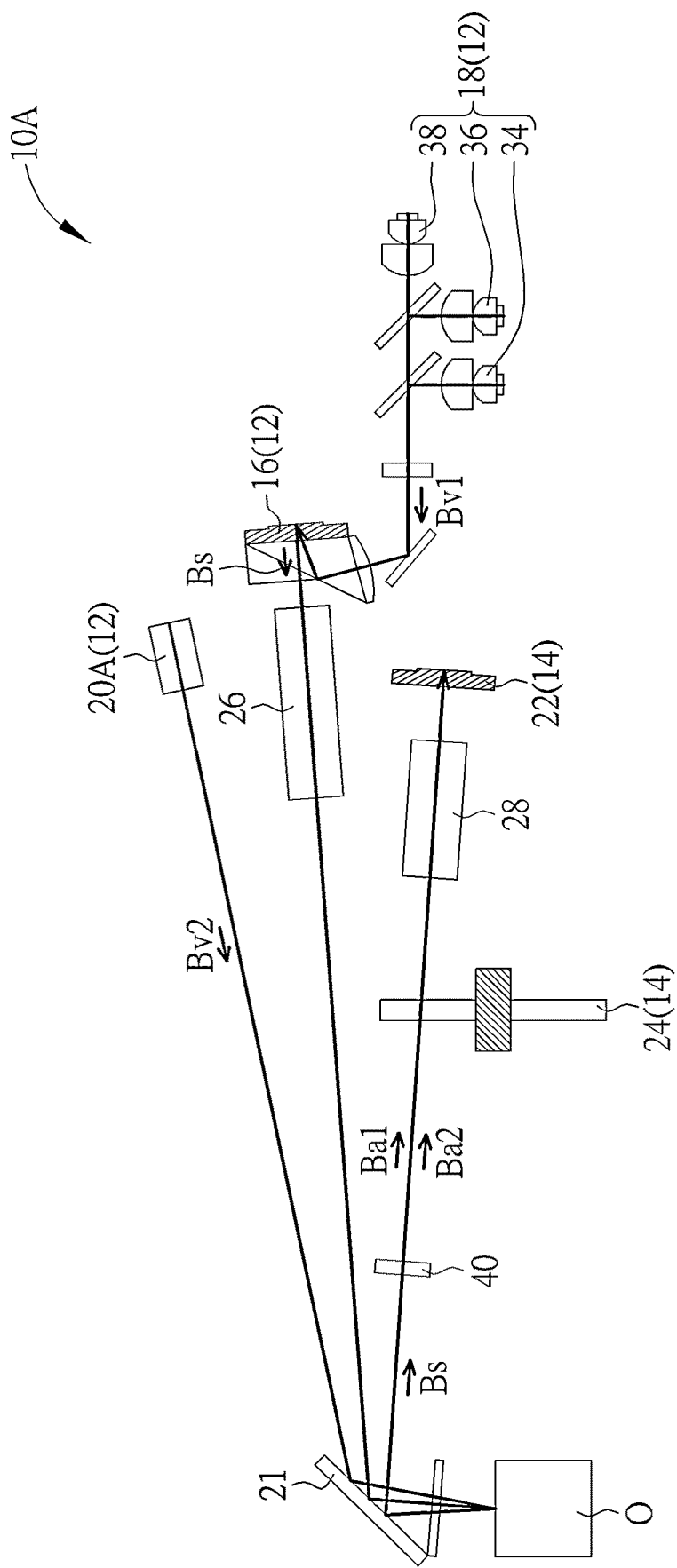
FIG. 5 is a diagram of the stereoscopic scanning device according to the second embodiment of the present invention.

Please refer to FIG. 5. FIG. 5 is a diagram of the stereoscopic scanning device 10A according to the second embodiment of the present invention. In the second embodiment, elements having the same numerals as ones of the first embodiment have the same structures and functions, and the detailed description is omitted herein for simplicity. The invisible beam light source 20A of the stereoscopic scanning device 10A can be disposed on position distant from the visible beam light source 18, and the invisible beam Bv2 emitted by the invisible beam light source 20A can be projected onto the target object O without passing through the projection lens assembly 26. The color filter 24 of the stereoscopic scanning device 10A can be the annular filter or the strip filter, which may only include the first filtering region 30 and the second filtering region 32, or can include the first filtering region 30 and the second filtering region 32 and the visible light transmittance area 42, as the embodiments shown in FIG. 2 to FIG. 4.

Figure 6:
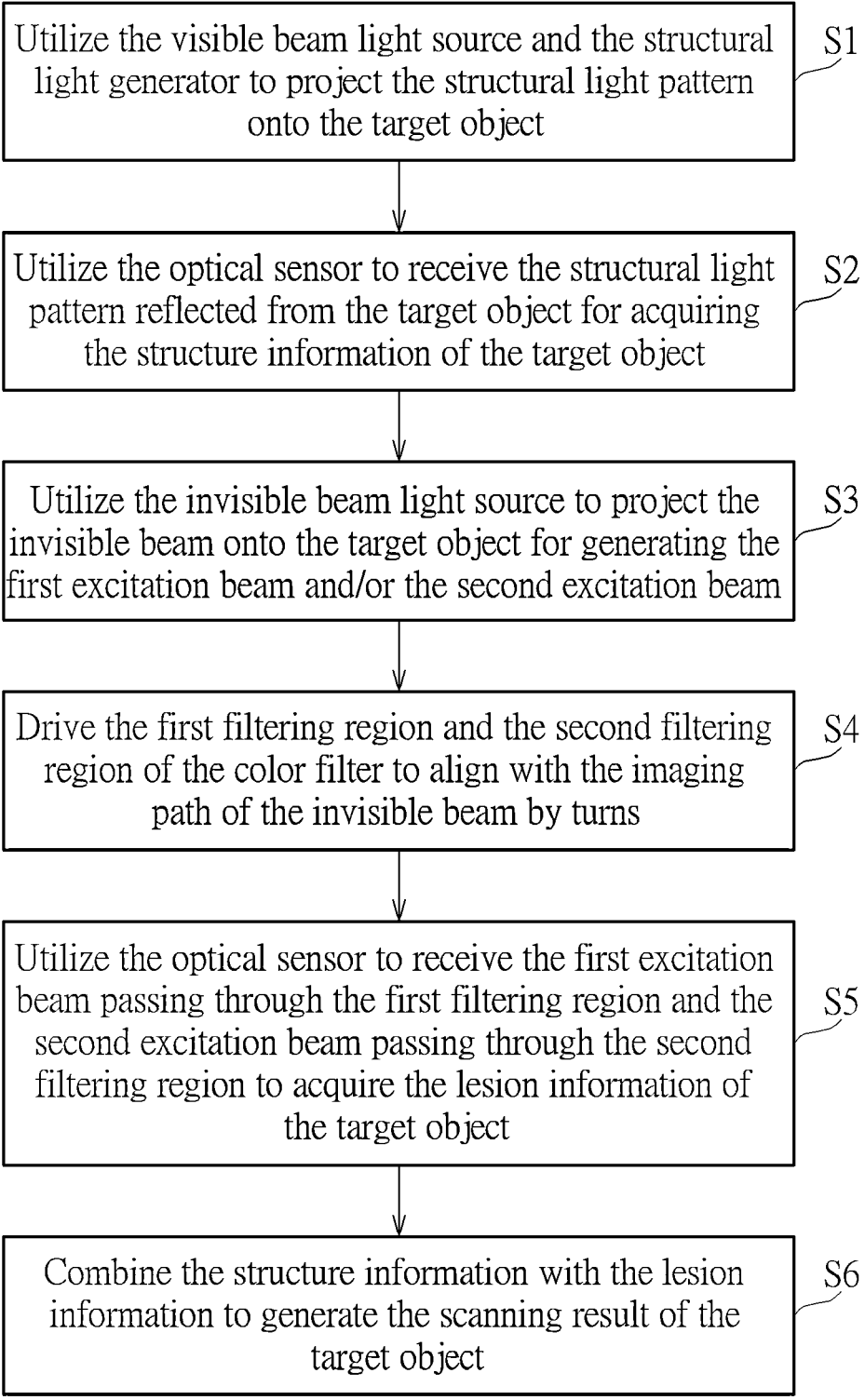
FIG. 6 is a flow chart of the stereoscopic scanning method acquiring structure information of the target object and detecting lesion information of the target object according to the embodiment of the present invention.

Please refer to FIG. 6. FIG. 6 is a flow chart of the stereoscopic scanning method acquiring structure information of the target object O and detecting lesion information of the target object O according to the embodiment of the present invention. First, step S1 can be executed to utilize the visible beam light source 18 and the structural light generator 16 to project the structural light pattern Bs onto the target object O. The visible beam light source 18 can at least include the blue light emitter 34 used to emit the visible beam Bv1 belonging to the blue light beam, and the visible beam Bv1 can be provided for the structural light generator 16 to generate the structural light pattern Bs; then, step S2 can be executed to utilize the optical sensor 22 to receive the structural light pattern Bs (such as a blue light pattern) reflected from the target object O for acquiring the structure information of the target object O.

Then, step S3 can be executed to utilize the invisible beam light source 20 to project the invisible beam Bv2 onto the target object O for generating the first excitation beam Ba1 and/or the second excitation beam Ba2. The invisible beam Bv2 (such as the near ultraviolet light beam) projected onto the target object O can be excited by the bacteria to generate the first excitation beam Ba1 (such as the red fluorescent). The invisible beam Bv2 projected onto the normal area of the target object O can be excited to generate the second excitation beam Ba2 (such as the green fluorescent). If the target object O has the structural defect, the invisible beam Bv2 projected onto the structural defect of the target object O can show the partial black pattern on the tooth model.

Then, step S4 can be executed to drive the color filter 24 in the rotatable manner or the shiftable manner, which depends on a property of the color filter 24 (such as the annular filter or the strip filter), and the first filtering region 30 and the second filtering region 32 can align with the imaging path by turns; step S3 can be further executed to align the first filtering region 30, the second filtering region 32 and the visible light transmittance area 42 of the color filter 24A or 24B with the imaging path by turns.

Then, step S5 can be executed to utilize the optical sensor 22 to receive the first excitation beam Ba1 passing through the first filtering region 30 and the second excitation beam Ba2 passing through the second filtering region 32, so as to acquire the lesion information (such as the dental plaque or the structural defect of the tooth) of the target object O.

Final, step S6 can be executed to combine the structure information of the target object O acquired in step S2 and the lesion information of the target object O acquired in step S5 to generate the scanning result, so as to acquire the structure information of the target object O and detect the lesion information of the target object O.

Moreover, the stereoscopic scanning method of the present invention embodiment can acquire the colorful detection image of the tooth outline model in the normal mode, and further can acquire the detection image of the tooth outline model in the caries mode for detecting whether the tooth has the dental plaque or the structural defect.

Figure 7:
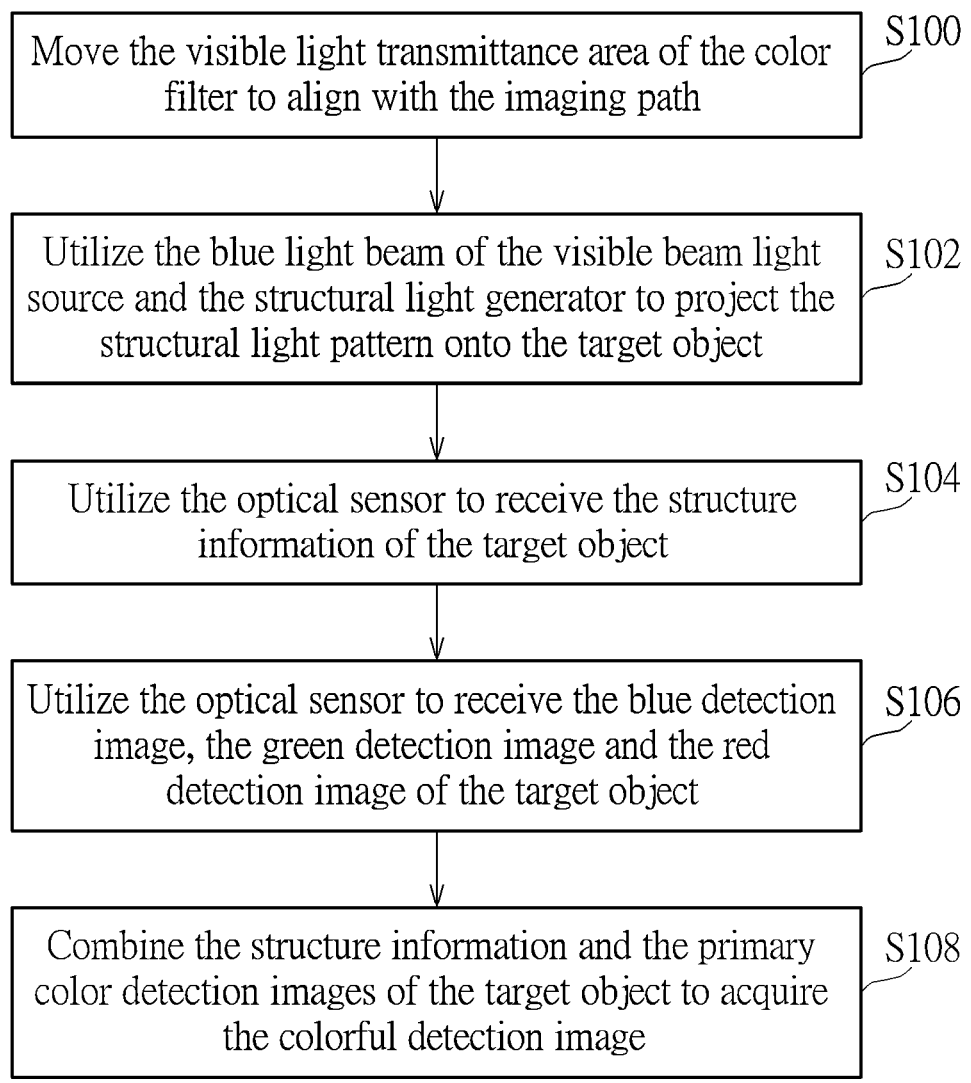
FIG. 7 is a flow chart of the stereoscopic scanning method in the normal mode according to the embodiment of the present invention.

Please refer to FIG. 7. FIG. 7 is a flow chart of the stereoscopic scanning method in the normal mode according to the embodiment of the present invention. When the stereoscopic scanning device 10 is switched into the normal mode, step S100 can be executed to move the color filter 24 having the first filtering region 30 and the second filtering region 32 out of the imaging path, or to switch the color filter 24A having the first filtering region 30, the second filtering region 32 and the visible light transmittance area 42 to a mode of aligning the visible light transmittance area 42 with the imaging path. Then, step S102 can be executed to utilize the blue light beam of the visible beam light source 18 and the structural light generator 16 to project the structural light pattern Bs onto the target object O. Then, step S104 can be executed to utilize the optical sensor 22 to receive the structural light pattern Bs that is reflected from the target object O and passes through the visible light transmittance area 42 of the color filter 24A or through the imaging path without the color filter 24, for acquiring the structure information of the target object O. Then, step S106 can be optionally executed to drive the visible beam light source 18 to alternately emit the green light beam and the red light beam, so that the optical sensor 22 can acquire the green detection image and the red detection image of the target object O. Final, step S108 can be executed to combine the structure information of the target object O that belongs to the blue detection image with the green detection image and the red detection image for acquiring the final colorful detection image.

Figure 8:
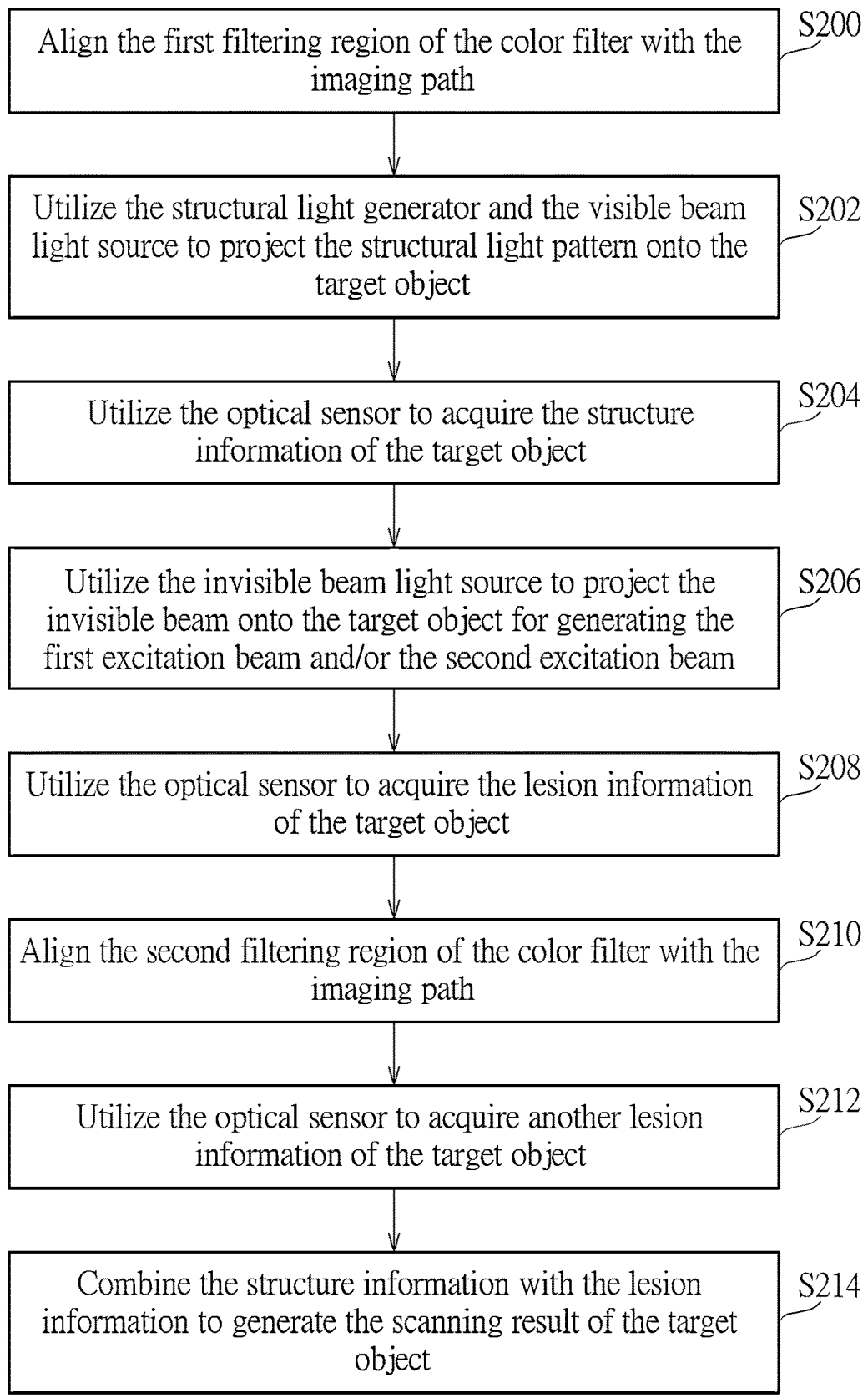
FIG. 8 is a flow chart of the stereoscopic scanning method in the caries mode according to the embodiment of the present invention.

Please refer to FIG. 8. FIG. 8 is a flow chart of the stereoscopic scanning method in the caries mode according to the embodiment of the present invention. When the stereoscopic scanning device 10 is switched into the caries mode, step S200 and step S202 can be executed to align the first filtering region 30 of the color filter 24 (or 24A or 24B) with the imaging path, and utilize the structural light generator 16 and the visible beam light source 18 to project the structural light pattern Bs onto the target object O. Then, step S204 can be executed to utilize the optical sensor 22 to receive the structural light pattern Bs reflected from the target object O for acquiring the structure information of the target object O. Step 200 can move the color filter 24 or 24B in the rotatable manner or the shiftable manner, which depends on the property of the color filter 24 (such as the annular filter or the strip filter); step S200 may align the visible light transmittance area 42 of the color filter 24A with the imaging path, or move the color filter 24 out of the imaging path, but the first filtering region 30 is still switched to position aligning with the imaging path in the subsequent step.

Then, step S206 can be executed to utilize the invisible beam light source 20 to project the invisible beam Bv2 onto the target object O for generating the first excitation beam Ba1 and/or the second excitation beam Ba2. The invisible beam Bv2 projected onto the target object O can be excited by the bacteria to generate the first excitation beam Ba1. The first excitation beam Ba1 can pass through the first filtering region 30 of the color filter 24 (which is currently located within the imaging path), and the second excitation beam Ba2 can be blocked by the first filtering region 30, so that step S208 can be executed to utilize the optical sensor 22 to acquire the lesion information of the target object O having the dental plaque. Then, step S210 can be executed to align the second filtering region 32 of the color filter 24 (or 24A or 24B) with the imaging path; the second excitation beam Ba2 can pass through the second filtering region 32 of the color filter 24 (which is currently located within the imaging path), and the first excitation beam Ba1 can be blocked by the second filtering region 32. The invisible beam Bv2 projected onto the target object O can show the partial black pattern on the defect of the tooth model, and the normal area of the tooth model can show the green fluorescent (which means the second excitation beam Ba2), and therefore step S212 can be executed to utilize the optical sensor 22 to acquire the lesion information of whether the target object O has the structural defect. Final, step S214 can be executed to combine the structure information with the lesion information to generate the scanning result of the target object O.

In conclusion, the stereoscopic scanning device and the stereoscopic scanning method of the present invention can dispose the rotatable or shiftable color filter on the imaging path. The optical sensor can be the monochromatic sensor, and the present invention can alternately activate the visible beam light source and the invisible beam light source at different points of time, to avoid the green fluorescent and the red fluorescent generated by the invisible beam projected onto the target object from being affected by the green light beam and the red light beam of the visible beam; the present invention can further alternately activate the blue light emitter, the green light emitter and the red light emitter of the visible beam light source at different points of time, so that the blue light beam and the green light beam and the red light beam can pass through the related filtering region of the color filter by turns. Therefore, the stereoscopic scanning device with a plaque detection function of the present invention can acquire the colorful detection image of the tooth outline model in the normal mode, and further acquire the detection image of the tooth outline model in the caries mode for detecting whether the tooth has the dental plaque or the structural defect.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A stereoscopic scanning device having a plaque detection function and applied to a target object, the stereoscopic scanning device comprising:
   a projection module, comprising:
      a structural light generator adapted to generate a structural light pattern;
      a visible beam light source adapted to emit a visible beam to a structural light generator so that the structure light pattern is projected onto the target object; and
      an invisible beam light source adapted to emit an invisible beam towards the target object for generating a first excitation beam and/or a second excitation beam, wherein an activation point of time of the invisible beam light source is different from activation points of time of a green light emitter and a red light emitter of the visible beam light source; and
   an imaging module relatively disposed adjacent to the projection module, the imaging module comprising:
      an optical sensor adapted to receive the structural light pattern reflected from the target object and the first excitation beam and the second excitation beam generated by the target object; and
      a color filter disposed on a side of the optical sensor facing the target object, the color filter having a first filtering region and a second filtering region adjacent to each other and aligning with the optical sensor by turns, the first filtering region allowing penetration of the visible beam and the first excitation beam and blocking transmission of the second excitation beam, the second filtering region allowing penetration of the visible beam and the second excitation beam and blocking transmission of the first excitation beam.

2. The stereoscopic scanning device of claim 1, wherein the visible beam light source and the invisible beam light source are adapted to alternately emit the visible beam and the invisible beam at different points of time, the visible beam is a blue light beam, the invisible beam is a near ultraviolet light beam, the first excitation beam is red fluorescent, and the second excitation beam is green fluorescent.

3. The stereoscopic scanning device of claim 1, wherein the visible beam light source comprises a blue light emitter, the green light emitter and the red light emitter adapted to respectively emit the visible beam belonging to a blue light beam, a green light beam and a red light beam, the visible beam light source is adapted to alternately emit the blue light beam, the green light beam and the red light beam at different points of time.

4. The stereoscopic scanning device of claim 1, wherein the optical sensor is a monochromatic sensor.

5. The stereoscopic scanning device of claim 1, wherein the color filter further has a visible light transmittance area adjacent to the first filtering region and the second filtering region.

6. The stereoscopic scanning device of claim 1, wherein the color filter partly aligns with the optical sensor, the color filter is an annular filter or a strip filter disposed between the optical sensor and the target object in a rotatable manner or in a shiftable manner, the annular filter is divided into the first filtering region and the second filtering region in different radial directions, the strip filter is divided into the first filtering region and the second filtering region in a shifting direction.

7. The stereoscopic scanning device of claim 1, wherein the projection module further comprises projection lens assembly disposed on a light end of the structural light generator, the structural light pattern is projected onto the target object through the projection lens assembly; the invisible beam is projected onto the target object through the projection lens assembly, or not through the projection lens assembly.

8. The stereoscopic scanning device of claim 1, wherein the projection module further comprises imaging lens assembly disposed on the side of the optical sensor facing the target object, the first filtering region and the second filtering region of the color filter alternately align with an imaging path between the optical sensor and the imaging lens assembly.

9. The stereoscopic scanning device of claim 1, wherein the imaging module further comprises an invisible beam filter disposed on the side of the optical sensor facing the target object.

10. A stereoscopic scanning method, comprising:
utilizing a visible beam light source and a structural light generator to project a structural light pattern onto a target object;
utilizing an optical sensor to receive the structural light pattern reflected from the target object for acquiring structure information of the target object;
utilizing an invisible beam light source to project an invisible beam onto the target object for generating a first excitation beam and/or a second excitation beam;
driving a first filtering region and a second filtering region of a color filter to alternately align with an imaging path of the invisible beam;
utilizing the optical sensor to receive the first excitation beam passing through the first filtering region and the second excitation beam passing through the second filtering region for acquiring lesion information of the target object; and
generating a scanning result by combining the structure information with the lesion information;
wherein an activation point of time of the invisible beam light source is different from activation points of time of a green light emitter and a red light emitter of the visible beam light source.

11. The stereoscopic scanning method of claim 10, further comprising:
activating the visible beam light source and the invisible beam light source alternately at different points of time.

12. The stereoscopic scanning method of claim 10, wherein the structural light pattern is a blue light pattern, the invisible beam is a near ultraviolet light beam, the first excitation beam is red fluorescent, and the second excitation beam is green fluorescent.

13. The stereoscopic scanning method of claim 10, wherein the visible beam light source comprises a blue light emitter, the green light emitter and the red light emitter adapted to respectively emit a blue light beam, a green light beam and a red light beam, the stereoscopic scanning method further comprises:
activating the light emitters of the visible beam light source alternately at different points of time.

14. The stereoscopic scanning method of claim 10, wherein driving the first filtering region and the second filtering region of the color filter to alternately align with the imaging path of the invisible beam comprises:
driving the first filtering region, the second filtering region and a visible light transmittance area of the color filter to alternately align with the imaging path; or, driving the color filter in a rotatable manner or in a shiftable manner so that the first filtering region and the second filtering region alternately align with the imaging path.

* * * * *